US012699415B2

(12) United States Patent
Jammetige et al.

(10) Patent No.: US 12,699,415 B2
(45) Date of Patent: Aug. 4, 2026

(54) ADJUSTING A CLOCK SIGNAL FREQUENCY BASED ON WORKLOAD LATENCY

(71) Applicants: Advanced Micro Devices, Inc., Santa Clara, CA (US); ATI Technologies ULC, Thornhill (CA)

(72) Inventors: Manjunath Jayaram Jammetige, Thornhill (CA); Anduil Alimucaj, Thornhill (CA); Anupam Thakur, Austin, TX (US); Ashwin Venkitram, Austin, TX (US); Yanfei Zhao, Thornhill (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 103 days.

(21) Appl. No.: 18/745,995

(22) Filed: Jun. 17, 2024

(65) Prior Publication Data

US 2025/0383681 A1      Dec. 18, 2025

(51) Int. Cl.
G06F 1/04          (2006.01)
(52) U.S. Cl.
CPC ..................................... G06F 1/04 (2013.01)
(58) Field of Classification Search
CPC ....................................................... G06F 1/04
USPC ....................................................... 713/600
See application file for complete search history.

(56)              References Cited

U.S. PATENT DOCUMENTS

| | | | | |
|---|---|---|---|---|
| 5,935,232 A | * | 8/1999 | Lambrecht ............ | G06F 13/368 |
| | | | | 375/E7.02 |
| 7,551,623 B1 | * | 6/2009 | Feroz .................... | H04L 47/562 |
| | | | | 709/224 |
| 8,903,995 B1 | * | 12/2014 | Basak ..................... | H04L 43/08 |
| | | | | 709/224 |
| 9,459,652 B1 | * | 10/2016 | Landers ................... | G06F 1/12 |
| 11,092,646 B1 | * | 8/2021 | Ghosh ................. | G11C 11/4076 |
| 2001/0056515 A1 | * | 12/2001 | Jacobs .................. | G06F 13/364 |
| | | | | 710/240 |
| 2002/0124080 A1 | * | 9/2002 | Leighton ............. | H04L 67/1038 |
| | | | | 709/224 |
| 2004/0170158 A1 | * | 9/2004 | Man-Hak Tso ......... | H04L 51/23 |
| | | | | 370/351 |
| 2004/0193397 A1 | * | 9/2004 | Lumb ................... | G06F 13/105 |
| | | | | 703/24 |
| 2004/0215986 A1 | * | 10/2004 | Shakkarwar .......... | G06F 1/3253 |
| | | | | 713/300 |
| 2004/0236534 A1 | * | 11/2004 | Wheless, Jr. ....... | G06F 11/3466 |
| | | | | 714/E11.2 |
| 2006/0090163 A1 | * | 4/2006 | Karisson ............. | G06F 11/3409 |
| | | | | 718/105 |
| 2008/0247325 A1 | * | 10/2008 | Vaitaitis .............. | H04L 43/0858 |
| | | | | 370/252 |
| 2014/0070854 A1 | * | 3/2014 | Kaviani ................. | G01R 23/02 |
| | | | | 327/119 |

(Continued)

*Primary Examiner* — Paul R. Myers
(74) *Attorney, Agent, or Firm* — Patterson + Sheridan, LLP

(57)              ABSTRACT

An integrated circuit device performs a method for adjusting a clock signal frequency. The method includes receiving a workload, and determining a latency parameter by sampling data of the workload. Further, an activation parameter is determined based on a data bandwidth on the workload. A clock signal of the IC device is adjusted based on the latency parameter and the activation parameter.

20 Claims, 4 Drawing Sheets

(56)     References Cited

U.S. PATENT DOCUMENTS

| | | | |
|---|---|---|---|
| 2015/0222377 A1* | 8/2015 | Chieco | H04J 3/0685 |
| | | | 370/503 |
| 2015/0222715 A1* | 8/2015 | Rahman | H04L 43/50 |
| | | | 709/224 |
| 2018/0336929 A1* | 11/2018 | Filippini | H04N 21/43615 |
| 2019/0199602 A1* | 6/2019 | Zhang | G06F 9/45558 |
| 2019/0258561 A1* | 8/2019 | Loteanu | G06F 16/9024 |
| 2019/0334801 A1* | 10/2019 | Dutta | H04L 43/16 |
| 2021/0096855 A1* | 4/2021 | Cole | G06F 9/3869 |

* cited by examiner

300

Receive a workload ⌐ 310

Determine a latency parameter for the workload ⌐ 320

Determine an activation parameter for the workload ⌐ 330

Adjust a clock signal based on the latency parameter and the activation parameter ⌐ 340

ADJUSTING A CLOCK SIGNAL FREQUENCY BASED ON WORKLOAD LATENCY

TECHNICAL FIELD

Examples of the present disclosure generally relates to adjusting a clock signal based on a latency parameter and an activation parameter of a workload.

BACKGROUND

An integrated circuit (IC) device uses one or more clock signals to control the functionality of circuit elements within the IC device. For example, a memory clock signal may be used by a memory controller and/or memory circuitry of the IC device. During operation, the IC device uses dynamic power management to adjust the frequency (levels) of a clock signal based on the available bandwidth and/or power consumption of a workload. When a workload associated with high bandwidth (e.g., a large amount of data) is received by an IC device, a frequency (level) of a clock signal is increased. For workloads associated with lower bandwidths, a frequency (level) of the clock signal is decreased. Increasing and decreasing the frequency of a clock signal based on data bandwidth dynamically adjusts the corresponding power consumption. However, current processes for adjusting the frequency of a clock signal are dependent on the data bandwidth of a workload, and are not able to adjust a clock signal frequency for latency sensitive workloads that are associated with lower bandwidths. Accordingly, there is a need for an improved process for adjusting clock signal frequencies based on workload bandwidth and workload latency sensitivity.

SUMMARY

In one example, a method includes receiving, at an integrated circuit (IC) device, a workload, and determining a latency parameter by sampling data of the workload. Further, the method includes determining an activation parameter based on a data bandwidth on the workload, and adjusting a clock signal of the IC device based on the latency parameter and the activation parameter.

In one example, an IC device includes input/output interface circuitry, first circuitry, second circuitry, and clock controller circuitry. The input/output interface circuitry receives a workload. The first circuitry samples data of the workload. The second circuitry determines an activation parameter based on a data bandwidth on the workload. The clock controller circuitry adjusts a clock signal of the IC device based on a latency parameter and the activation parameter. The latency parameter is determined based on the sampled data.

In one example, a computer system includes a host device and an IC device. The host device outputs a workload. The IC device receives the workload, and determines a latency parameter by sampling data of the workload. Further, the IC device determines an activation parameter based on a data bandwidth on the workload. The IC device further adjusts a clock signal of the IC device based on the latency parameter and the activation parameter.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
FIG. 1 illustrates a block diagram of an integrated circuit (IC) device.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

An integrated circuit (IC) device uses one or more clock signals to control the functionality of circuit elements within the IC device. For example, a memory clock signal may be used by memory controller circuitry and/or memory circuitry of the IC device. During operation, the IC device uses dynamic power management to adjust the frequency (levels) of a clock signal based on the data bandwidth of a workload and/or power consumption. When a workload associated with high data bandwidth (e.g., a large amount of data) is received by an IC device, a frequency (level) of a clock signal is increased. For a workload associated with lower data bandwidths, a frequency (level) of the clock signal is decreased. Increasing and decreasing the frequency of a clock signal based on workload data bandwidth, dynamically adjusts the corresponding power consumption.

IC devices adjust the frequency of a clock signal, or signals, to adjust the power consumption of the IC devices. For example, a frequency of a clock signal may be increased based on an increase in data bandwidth (e.g., an amount of data to be communicated), and a frequency of a clock signal may be decreased based on a decrease in data bandwidth. In one example, when initializing an application on an IC device, a clock signal frequency is increased (e.g., pulled high) due to large amount of data that is communicated and stored within memory circuitry of the IC device. After the data has been stored within the memory circuitry, and the data bandwidth decreases, the clock signal frequency is decreased (e.g., pulled low). Increasing and decreasing the frequency of a clock signal reduces power consumption as power consumption is lower when operating at lower frequencies.

However, current processes for controlling the frequency of a clock signal are based on the data bandwidth of a workload and do not take into account the latency of a workload. For example, a workload may be associated with a low bandwidth, but a high latency (e.g., latency sensitive workloads). Accordingly, current processes for controlling the clock signal frequency may not increase the clock signal frequency for latency sensitive workloads, decreasing the performance of the IC device for such workloads.

The clock signal frequency control process described in the following dynamically adjusts the clock signal frequency based on the data bandwidth parameter and latency parameter of a workload. The latency parameter and data bandwidth parameter is determined for a workload, and used to determine whether or not to increase the frequency of a clock signal. In one example, the latency parameter and the data bandwidth parameter are weighted. The weights for the latency parameter and data bandwidth parameter differ from each other, and may be set based on performance metrics for the corresponding IC device.

FIG. 1 illustrates schematic block diagram of an IC device 100. The IC device 100 includes one or more IC chips. In one example, the IC device 100 is a system-on-chip, and includes one or more processing elements and/or one or more memory elements. In one or more examples, the IC device 100 is a central processing unit (CPU) or a graphics processing unit (GPU). Further, in one or more examples, the IC device 100 is a field programmable gate array (FPGA) IC device or an application specific IC (ASIC) device, among others.

The IC device 100 includes input/output (I/O) interface circuitry 110, data path circuitry 120, interconnect circuitry 130, memory controller (MC) circuitry 140, frame buffer circuitry 150, and clock control circuitry 160. In one example, the IC device 100 receives a workload from an external circuit device (e.g., a processing device or a memory device, among others), and communicates the workload to the frame buffer circuitry 150 to write data into the frame buffer circuitry 150 and/or read data from the frame buffer circuitry 150. For example, a workload is received by the I/O interface circuitry 110 via signal 102, and communicated from the I/O interface circuitry 110 to the data path circuitry 120 via signal 112. Further, the workload is communicated from the data path circuitry 120 to the interconnect circuitry 130 via signal 122, and to the MC circuitry 140 from the interconnect circuitry 130 via signal 131. Further, the MC circuitry 140 communicates the workload to the frame buffer circuitry 150 via signal 142.

The IC device 100 is connected to one or more other IC device via the I/O interface circuitry 110. The other IC devices may be CPUs and/or GPUs, among others.

A workload is associated with reading data from the frame buffer circuitry 150 and/or writing (storing) data to the frame buffer circuitry 150. In one example, a workload corresponds to loading (e.g., copying) data provided from another IC device (e.g., an IC device external to the IC device 100). In one example, an amount of data loaded to complete a workload corresponds to the data bandwidth of the workload.

The I/O interface circuitry 110 receives and/or outputs data associated with the workload via signal 112. A workload is output as the signal 112. The I/O interface circuitry 110 includes I/O circuitry and interface circuitry. The I/O circuitry may be peripheral component interconnect (PCI) circuitry. In one example, the I/O circuitry is PCI express (PCIe) circuitry. In other examples, the I/O circuitry may be other types of I/O circuitry. The interface circuitry is bound interface (BIF) circuitry. In other examples, the interface circuitry is other types of interface circuitry.

The data path circuitry 120 is coupled to the output I/O interface circuitry 110. The data path circuitry 120 receives a workload (e.g., a signal or signals associated with a workload) from the output I/O interface circuitry 110 via signal 112. In one example, the data path circuitry 120 outputs the signal 122 to the I/O interface circuitry 110. The signal 122 is associated with a workload.

The data path circuitry 120 includes HUB circuitry and/or host data path (HDP) circuitry. In one example, the HUB circuitry includes memory management (MM) HUB circuitry and/or System HUB circuitry. The data path circuitry 120 includes interface circuitry that receives and output signals associated with a workload. For example, the data path circuitry 120 receives signals (e.g., signal 112) from the I/O interface circuitry 110 and outputs signals (e.g., the signal 121) to the interconnect circuitry 130. In one example, the data path circuitry 120 includes one or more memory mapped master and slave interconnect devices. The memory mapped interconnect devices may be AXI interconnect devices.

The data path circuitry 120 handles frame buffer read commands and/or write commands associated with workloads. For example, the data path circuitry 120 receives a frame buffer write command associated with a workload via a first interface (e.g., a slave interface) and communicates the frame buffer write command to the interconnect circuitry 130 via a second interface (e.g., a master interface).

In one example, the data path circuitry 120 is further coupled to the clock control circuitry 160. The data path circuitry 120 outputs a latency data (e.g., a latency parameter) associated with a workload to the clock control circuitry 160. The latency data may correspond to an average bandwidth for a period (window). In one example, the data path circuitry 120 samples the incoming data associated with a workload determines a data bandwidth value from the data samples, and outputs the data bandwidth average to the clock control circuitry 160. In another example, the data path circuitry 120 samples the incoming data associated with a workload, and outputs the samples to the clock control circuitry 160, and the control circuitry determines the data bandwidth value from the samples. In one or more examples, the data path circuitry 120 outputs the data associated with a workload to the clock control circuitry 160, the clock control circuitry 160 samples the data associated with a workload and determines a data bandwidth value from the data samples.

The interconnect circuitry 130 is coupled to an output of the data path circuitry 120. The interconnect circuitry 130 receives the signal 122 associated with a workload from the data path circuitry 120. The interconnect circuitry 130 operates (e.g., functions) based on the clock signal 103. In one example, the interconnect circuitry 130 is coupled to a master interconnect of the data path circuitry 120. Further, the interconnect circuitry 130 is coupled to memory management HUB (MM HUB) circuitry of the data path circuitry. Further, the interconnect circuitry 130 is coupled to an output of the clock control circuitry 160. For example, the clock control circuitry 160 outputs a control signal 161 to the interconnect circuitry 130. The frequency of the clock signal 103 is increased or decreased based on the control signal 161. In another example, the clock control circuitry 160 outputs an adjusted clock signal 103 as the control signal 161 to the interconnect circuitry 130.

The interconnect circuitry 130 controls the flow of traffic between the data path circuitry 120 and the MC circuitry 140. The interconnect circuitry 130 may be data fabric circuitry. In one example, the interconnect circuitry 130 is bi-directionally connected between the data path circuitry 120 and the MC circuitry 140. The interconnect circuitry 130 includes a crossbar switch that routes data and control signals associated with a workload between the data path circuitry 120 and the MC circuitry 140.

The MC circuitry 140 has an input is coupled to an output of the interconnect circuitry 130 and receives the signal 131 from the interconnect circuitry 130. Further, the MC circuitry 140 has an input coupled to the output of the clock control circuitry 160 and an output coupled to an input of the clock control circuitry 160. The MC circuitry 140 operates based on the clock signal 104.

The MC circuitry 140 communicates data and control signals associated with workloads to and from the from the frame buffer circuitry 150. In one example, the MC circuitry 140 includes power calculator circuitry. The power calculator circuitry may be a dynamic capacitance (CAC) calculator. In such an example, the power calculator circuitry includes one or more capacitors. The power calculator circuitry measures the activation capacitance associated with a workload. The activation capacitance may be referred to as an activation parameter. In one example, as the data bandwidth increases, the activation capacitance is increased. Capacitance values may be modeled and associated with different clock signal frequencies (e.g., levels). For example, higher capacitance (e.g., a higher activation capacitance) values are associated with higher clock signal frequencies.

In one example, the MC circuitry 140 outputs the activation capacitance (e.g., the capacitance values) to the clock control circuitry 160. In such an example, the clock control circuitry 160 determines the frequency (or level) of the clock signal based on the activation capacitance. For example, the clock control circuitry 160 may include one or more activation thresholds (e.g., represented as a look-up-table, or some other representation) that associate the activation capacitance with the clock signal frequencies. The clock control circuitry 160 determines the clock signal frequency for the clock signal 103 and/or the clock signal 104 of the interconnect circuitry 130 and/or the MC circuitry 140 based on the activation capacitance and the activation thresholds.

The MC circuitry 140 outputs data and/or control signals associated with a workload to and/or from the frame buffer circuitry 150. In one example, the MC circuitry 140 outputs data to be written (e.g., a write command of a workload) to the frame buffer circuitry. In another example, the MC circuitry 140 requests data associated with read command of a workload from the frame buffer circuitry 150.

The clock control circuitry 160 has inputs coupled to an output of the data path circuitry 120 and to the output of the MC circuitry 140. The clock control circuitry 160 receives the signal 121 from the data path circuitry 120. The clock control circuitry 160 receives the signal 141 from the MC circuitry 140. The signal 121 includes one or more of data associated with a workload, data samples for a workload, a data bandwidth average for a workload, and/or a control signal indicating to increase or decrease a frequency of a clock signal. The signal 141 includes an activation capacitance value and/or a control signal indicating to increase or decrease a frequency of the control signal 162.

As is described in greater detail in the following, the clock control circuitry 160 determines whether or not to increase the frequency of the clock signal 103 and/or 104 based on the signal 121 and 141. In one example, the clock control circuitry 160 applies a first weight to the signal 121 to determine to increase or decrease the frequency of the clock signal 103. The clock control circuitry 160 applies a second weight to the signal 141 to determine to increase or decrease the frequency of the clock signal 103 and/or the clock signal 104. The first weight has a value that is greater than or less than a value of the second weight. The weighted signals 121 and the weighted signal 141 are used to determine to increase or decrease the frequency of the clock signal 103 and/or 104.

In one example, the clock control circuitry 160 outputs the control signal 161 to the interconnect circuitry 130 indicating an increase or decrease to the clock signal 103. The clock control circuitry 160 outputs the control signal 162 to the MC circuitry 140 indicating an increase or decrease to the clock signal 104.

Figure 2:
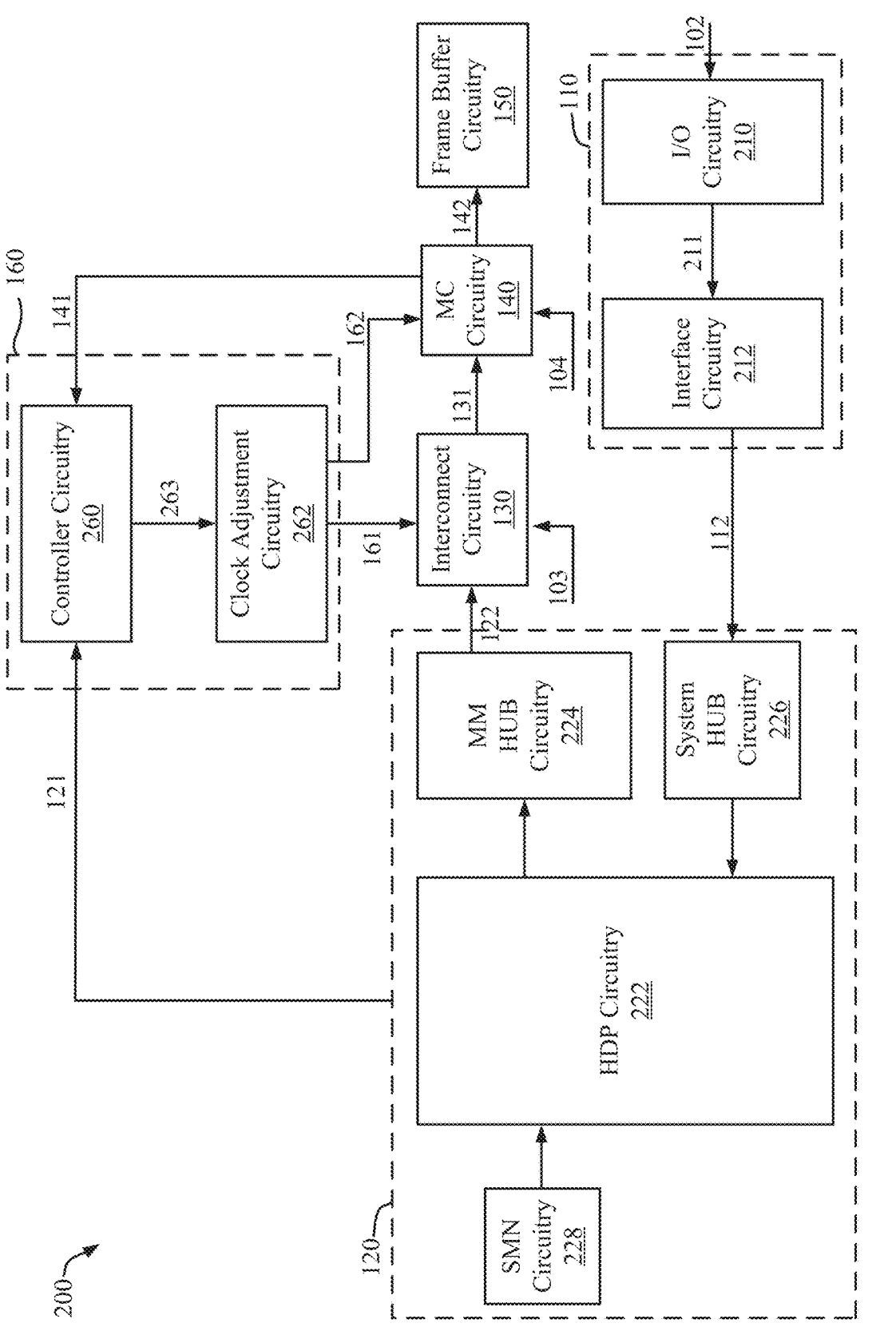
FIG. 2 illustrates a block diagram of an IC device.

FIG. 2 illustrates a block diagram of IC device 200, according to one or more examples. The IC device 200 is configured similar to the IC device 100 of FIG. 1. For example, the IC device 200 includes I/O interface circuitry 110, data path circuitry 120, interconnect circuitry 130, MC circuitry 140, frame buffer circuitry 150, and the clock control circuitry 160. In the example of FIG. 2, the I/O interface circuitry 110 includes I/O circuitry 210 and interface circuitry 212. The I/O circuitry 210 is PCI circuitry or other input/output circuitry. The interface circuitry 212 is BIF circuitry or other types of interface circuitry. The output of the I/O circuitry 210 is coupled to an input of the interface circuitry 212. The I/O circuitry 210 receives the workload via the signal 102, and outputs the signal 211 to the interface circuitry 212. The signal 211 includes data corresponding to, and is based on, the workload of the signal 102. The interface circuitry 212 provides communication between the I/O circuitry 210 and the data path circuitry 120. The interface circuitry 212 outputs the signal 112 to the data path circuitry 120. The signal 112 corresponds to the workload via the signal 102.

The data path circuitry 120 includes host data path circuitry (HDP circuitry) 222, MM HUB circuitry 224, system HUB circuitry 226, and system management network (SMN) circuitry 212. The HDP circuitry 222 includes one or more communication interface (AXI) that couple the System HUB circuitry 226 with the MM HUB circuitry 224. For example, the HDP circuitry includes master and slave interconnect circuitry that is used to connect input elements (e.g., the system HUB circuitry 226) with output elements (e.g., the MM HUB circuitry 224). Further, the SMN circuitry 228 is coupled to slave interconnect circuitry as an input to the HDP circuitry 222. The HDP circuitry 222 couples the SMN circuitry 228 with other circuitry elements within the IC device 200.

In one example, the HDP circuitry 222 outputs the signal 121 to the clock control circuitry 160. In another example, the MM HUB circuitry 224 outputs the signal 121 to the clock control circuitry 160. In one or more examples, the system HUB circuitry 226 outputs the signal 121 to the clock control circuitry 160.

FIG. 2 illustrates one example implementation of the data path circuitry 120. In other examples, the data path circuitry 120 may have other implementations.

The clock control circuitry 160 includes controller circuitry 260 and clock adjustment circuitry 262. The controller circuitry 260 receives the signal 121 and the signal 141. The controller circuitry 260 generates the signal 263 based on the signals 121 and the signal 141. The controller circuitry 260 further generates the signal 263 based on weights applied to the signals 121 and 141. The signal 263 includes an indication to adjust or not adjust a parameter or parameters of the clock signals 103 and/or 104.

The output of the controller circuitry 260 is coupled to an input of the clock adjustment circuitry 262. The signal 263 is received by the clock adjustment circuitry 262. The clock adjustment circuitry 262 indicates an adjustment to the clock signal 103 and/or the clock signal 104 based on the control signals 161 and 162. For example, the clock adjustment circuitry 262 generates the control signal 161 based on the signal 121 and the signal 141, and the respective weights applied to the signals 121 and 141.

FIG. 1 and FIG. 2 illustrate example configurations (implementations) for an IC device. In other examples, an IC device may have other configurations. For example, an IC device includes first circuitry for generating a latency parameter based on data samples of a workload, second circuitry for generating an activation parameter from a data bandwidth of a workload, and control circuitry for determining whether or not to adjust a clock signal based on the latency parameter and the activation parameter.

Figure 3:
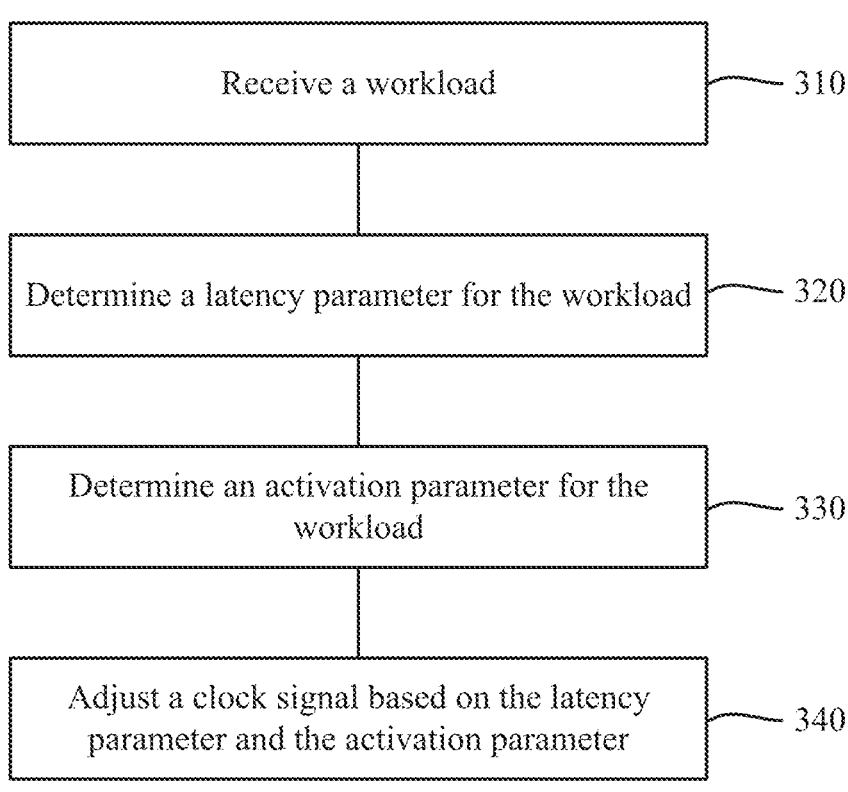
FIG. 3 illustrates a flowchart of a method for adjusting a clock signal of an IC device.

FIG. 3 illustrates a flowchart of a method 300 for adjusting a clock signal or signals, according to one or more examples. The method 300 is performed by an IC device. For example, the IC device 100 of FIG. 1 or 200 of FIG. 3 performs the method 300.

At 310 of the method 300, a workload is received. In one example, an IC device receives a workload. A workload is received from a circuit device (e.g., a processing device or a memory device, among others). With reference to FIG. 1 and FIG. 2, I/O circuitry 110 receives the workload via signal 102. The signal 102 includes data and control data associated with the workload.

At 320 of the method 300, a latency parameter for the workload is determined. For example, first circuitry of an IC device determines the latency parameter for the workload. The first circuitry may be data path circuitry (e.g., the data path circuitry 120). In other examples, the first circuitry is another circuit element of the IC device that determines the latency parameter for a workload. In one example, the data path circuitry 120 of FIG. 1 determines the latency parameter. The latency parameter is output via signal 121. Determining the latency parameter includes determining a data bandwidth parameter for a period (window). The data associated with the workload maybe in the form of data bursts. In one example, the incoming data associated with a workload is sampled. The samples are averaged, or combined in another way, to determine a data bandwidth parameter for the period. The data bandwidth parameter is the latency parameter. In one or more examples, the data bandwidth parameter is an activity percentage. In one example, the data bandwidth parameter is determined by averaging the data samples for the period, and is referred to as a data bandwidth average parameter. In another example, a median is determined from the data samples as the data bandwidth parameter.

In one example, the data path circuitry 120 determines the data samples from the data of the workload. The data path circuitry 120 outputs the data samples as signal 121 to the clock control circuitry 160. The clock control circuitry 160 determines the data bandwidth parameter from the data samples. In another example, the data path circuitry 120 determines the data bandwidth parameter from the data samples. In such an example, the data path circuitry 120 outputs the data bandwidth parameter as the signal 121 to the clock control circuitry 160. In one example, the data path circuitry 120 outputs data associated with the workload is output from the data path circuitry 120 as the signal 121. In such an example, the clock control circuitry 160 determines the data samples, and a data bandwidth parameter as described above.

In another example, the data path circuitry 120 samples the incoming data associated with a workload, and outputs the samples to the clock control circuitry 160. The control circuitry determines the data bandwidth value (e.g., average value, or a median value, among others) from the samples. In one or more examples, the data path circuitry 120 outputs the data associated with a workload to the clock control circuitry 160. The clock control circuitry 160 samples the data associated with a workload and determines a data bandwidth value from the data samples.

At 330 of the method 300, an activation parameter is determined for the workload. In one example, second circuitry of an IC device generates the activation parameter based on data and control signals associated with the workload. The second circuitry may be memory controller circuitry (e.g., the MC circuitry 140). In other examples, the second circuitry is another circuit element of the IC device that determines the activation parameter for a workload. In one example, the MC circuitry 140 determines the activation parameter based on the data and control signals associated with the workload. The MC circuitry 140 outputs the activation parameter as the signal 141 to the clock control circuitry 160. In one example, the MC circuitry 140 includes power calculator circuitry including one or more capacitors. The power calculator circuitry measures the activation capacitance associated from the data bandwidth of a workload. The activation capacitance may be referred to as an activation parameter. The data bandwidth corresponds to the activation capacitance. For example, higher capacitance values are associated with higher data bandwidths, and lower capacitance values are associated with lower data bandwidths. The MC circuitry 140 outputs the activation parameter as the signal 141 to the clock control circuitry 160.

At 340 of the method 300, a clock signal is adjusted based on the latency parameter and the activation parameter. An IC device adjusts the clock signal based on the latency parameter and the activation parameter. In one example, the IC device 100 adjusts the clock signal based on the latency parameter and the activation parameter. In on example, the IC device 100 applies a first weight to the latency parameter and a second weight to the activation parameter. The first weight differs from the second weight. A value of the first weight is less than or greater than a value of the second weight. The weights are used to adjust which of the latency parameter and the activation parameter accounts for a larger factor when determining whether or not to adjust a clock signal. In one example, the value of the first weight and the second weight are set to control when a clock signal (e.g., the clock signal 103 and/or 104) is adjusted relative to values of the latency parameter and the activation parameter. Increasing the weight applied to the latency parameter relative to the weight applied to the activation parameter makes the latency parameter a larger factor in determining when to adjust a clock signal (e.g., the clock signal 103 and/or 104). Further, increasing the weight applied to the activation parameter relative to the weight applied to the latency parameter makes the activation parameter a larger factor in determining when to adjust a clock signal. In one example, the weights are set based on performance metrics of the corresponding IC device.

In one example, the weighted latency parameter is compared to a latency threshold (or first threshold) and the weighted activation parameter is compared to an activation threshold (or a second threshold). When the weighted latency parameter and the weighted activation parameter exceed, or meet, (e.g., satisfy) the latency parameter and activation parameter, respectively, the frequency of the clock signal is increased (e.g., the clock signal is adjusted). When the weighted latency parameter and the weighted activation parameter are less than the latency parameter and activation parameter, respectively, the frequency of the clock signal is decreased (e.g., the clock signal is adjusted). In an example where the weighted latency parameter and the weighted activation parameter are equal to the latency parameter and activation parameter, a frequency of the clock signal is maintained.

In one example, the weighted latency parameter is compared to multiple latency thresholds. Each latency threshold is associated with a particular clock signal level (e.g., a clock signal frequency). Thresholds having higher values are associated with higher frequencies. In one or more examples, the weighted activation parameter is compared to multiple activation thresholds. Each activation threshold is associated with a particular clock signal level (e.g., a clock signal frequency). A clock signal level is selected based on the latency threshold and activation threshold met by the weighted activation parameter and the weighted latency parameter. In an example having three clock signal levels, each being associated with a different latency threshold and activation threshold. The lowest clock signal level met by the latency parameter and activation parameter is selected. In another example, the high clock signal level met by the latency parameter and the activation parameter is selected.

In one example, each clock signals 103 and 104 is associated with respective latency and activation thresholds and/or clock signal levels. Accordingly, the clock signal level for each of the clock signals 103 and 104 may be determined independent from each other. In other examples, a common clock signal level is determined for each of the clock signals 103 and 104.

The clock control circuitry 160 outputs the control signal 161 indicating to adjust the clock signal 103. The control signal 161 may provide an indication to increase, decrease, or maintain a frequency of the clock signal 103. In one example, the control signal 161 provides an indication of a particular clock signal level for the clock signal 103. The clock control circuitry 160 outputs the signal 162 indicating to adjust the clock signal 104. The signal 162 may provide an indication to increase, or decrease, a frequency of the clock signal 104. In one example, the control signal 161 provides an indication of a particular clock signal level for the clock signal 104.

The clock signal 103 is adjusted based on the control signal 161 and/or the clock signal 104 is adjusted based on the signal 162. In one example, the frequency of the clock signal 103 is increased, or decreased based on the control signal 161. The frequency of the clock signal 104 is increased, or decreased based on the signal 162.

Figure 4:
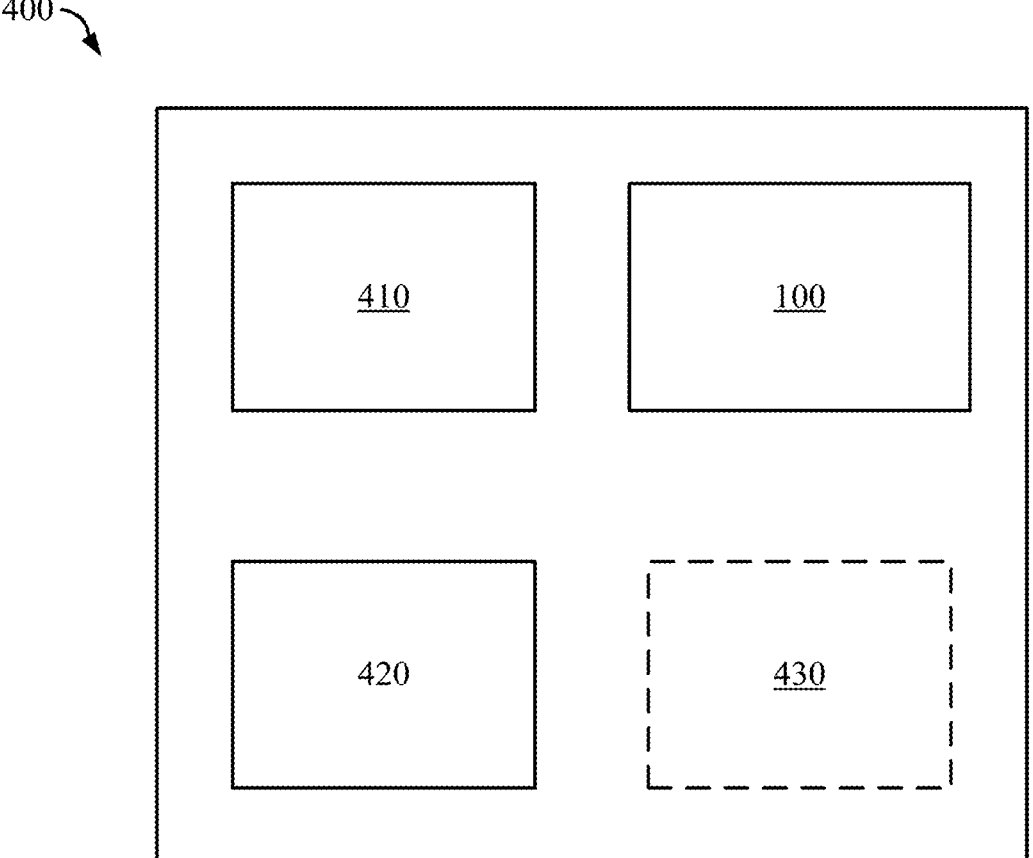
FIG. 4 illustrates a block diagram of a computer device.

FIG. 4 is a schematic diagram of a computer device 400. The computer device 400 may be a personal computer device, a tablet device, a mobile device, a web appliance, a server, a network device (e.g., network router, a switch or bridge), or any computing device capable of executing a set of instructions. In one example, the computer device 400 is referred to as a host device.

The computer device (or computing device) 400 includes the IC device 100, a memory device 410, and interface circuitry 420. The memory device 410 is a read-only memory (ROM), flash memory, dynamic random access memory (DRAM) such as synchronous DRAM (SDRAM), a flash memory, or a static random access memory (SRAM), among others. The interface circuitry 420 transmits and receives data signals, another types of signals, to and from other computer devices. The interface circuitry 420 may be a wireless communication device and/or a wired communication device.

In one example, the computer device 400 further includes a CPU (or other type of processing device) 430. The CPU 430 may also be referred to as a central processing device. In such an example, the IC device 100 is a GPU. The memory device 410 stores instructions executable by the CPU 430 and/or the IC device 100 to perform one or more functions of the computer device 400. Further, the memory device 410 stores data to be used by the CPU 430 and/or the IC device 100.

In one example, the CPU 430 is omitted and an IC device 100 performs the functions of the CPU. Accordingly, the IC device 100 is referred to as a central processing device. In one more examples, the computer device 400 includes two or more IC devices 100. In such an example, the IC devices 100 perform similar functions or different functions. In one example, a first IC device 100 functions as a central processing device and a second IC device 100 functions as a GPU or another type accelerator device. In another example, each IC device 100 functions as a GPU.

In one example, the IC device 100 receives workloads from the CPU 430, or another processing device, the memory device 410, the interface circuitry 420, or another circuit element. The IC device and assigns and executes the workloads as described above with regard to the method 300 of FIG. 3.

While the foregoing is directed to specific examples, other and further examples may be devised without departing from the basic scope thereof, and the scope thereof is determined by the claims that follow.

What is claimed is:

1. A method comprising:
receiving, at an integrated circuit (IC) device, a workload;
determining a latency parameter from data samples generated by sampling data of the workload over a period associated with receiving the workload;
determining an activation parameter based on an activation capacitance associated with a data bandwidth of the workload; and
adjusting a clock signal of the IC device based on comparing a weighted version of the latency parameter and a weighted version of the activation parameter to thresholds.

2. The method of claim 1 further comprising:
applying a first weight to the latency parameter to generate the weighted version of the latency parameter; and
applying a second weight to the activation parameter to generate the weighted version of the activation parameter.

3. The method of claim 2, wherein the first weight differs from the second weight.

4. The method of claim 2 further comprising comparing the weighted version of the latency parameter to a latency threshold of the thresholds and comparing the weighted version of the activation parameter to an activation threshold of the thresholds.

5. The method of claim 4, wherein the adjusting the clock signal comprising increasing a frequency of the clock signal based on the weighted version of the latency parameter meeting the latency threshold and the weighted version of the activation parameter meeting the activation threshold.

6. The method of claim 1, wherein the IC device is a graphics processing device.

7. The method of claim 1, wherein at least one of interconnect circuitry and memory controller circuitry configured to operate based on the clock signal.

8. An integrated circuit (IC) device comprising:
  input/output interface circuitry configured to receive a workload;
  first circuitry configured to sample data of the workload over a period associated with receiving the workload;
  second circuitry configured to determine an activation parameter based on an activation capacitance associated with a data bandwidth of the workload; and
  clock controller circuitry configured to adjust a clock signal of the IC device based on comparing a weighted version of a latency parameter and a weighted version of the activation parameter, wherein the latency parameter is determined based on data samples generated from the sampled data.

9. The IC device of claim 8, wherein the clock controller circuitry is further configured to:
  apply a first weight to the latency parameter to generate the weighted version of the latency parameter; and
  apply a second weight to the activation parameter to generate the weighted version of the activation parameter.

10. The IC device of claim 9, wherein the first weight differs from the second weight.

11. The IC device of claim 9, wherein the clock controller circuitry is further configured to compare the weighted version of the latency parameter to a latency threshold of the thresholds and compare the weighted version of the activation parameter to an activation threshold of the thresholds.

12. The IC device of claim 11, wherein adjusting the clock signal comprises increasing a frequency of the clock signal based on the weighted version of the latency parameter meeting the latency threshold and the weighted version of the activation parameter meeting the activation threshold.

13. The IC device of claim 8, wherein the IC device is a graphics processing device.

14. The IC device of claim 8 further comprising at least one of interconnect circuitry and memory controller circuitry configured to operate based on the clock signal.

15. A computer system comprising:
  a circuit device configured to output a workload; and
  an integrated circuit device configured to:
    receive the workload;
    determine a latency parameter from data samples generated by sampling data of the workload over a period associated with receiving the workload;
    determine an activation parameter based on an activation capacitance associated with a data bandwidth of the workload; and
    to adjust a clock signal of the IC device based on comparing a weighted version of the latency parameter and a weighted version of the activation parameter to thresholds.

16. The computer system of claim 15, wherein the IC device is further configured to:
  apply a first weight to the latency parameter to generate the weighted version of the latency parameter; and
  apply a second weight to the activation parameter to generate the weighted version of the activation parameter.

17. The computer system of claim 16, wherein the first weight differs from the second weight.

18. The computer system of claim 16, wherein the IC device is further configured to compare the weighted version of the latency parameter a latency threshold of the thresholds and compare the weighted version of the activation parameter to an activation threshold of the thresholds.

19. The computer system of claim 18, wherein adjusting the clock signal comprising increases a frequency of the clock signal based on the weighted version of the latency parameter meeting the latency threshold and the weighted version of the activation parameter meeting the activation threshold.

20. The computer system of claim 15, wherein the IC device is a graphics processing device.

* * * * *